(12) United States Patent
Koide et al.

(10) Patent No.: US 8,198,856 B2
(45) Date of Patent: Jun. 12, 2012

(54) ELECTRONIC APPARATUS, CHARGING METHOD THEREFOR, AND BATTERY

(75) Inventors: Keisuke Koide, Tokyo (JP); Yoshiyuki Tanaka, Nagano (JP); Satoshi Okachi, Tokyo (JP); Takayuki Yajima, Nagano (JP)

(73) Assignee: Sony Corporation, Tokyo (JP)

( * ) Notice: Subject to any disclaimer, the term of this patent is extended or adjusted under 35 U.S.C. 154(b) by 732 days.

(21) Appl. No.: 11/872,202

(22) Filed: Oct. 15, 2007

(65) Prior Publication Data

US 2008/0238358 A1    Oct. 2, 2008

(30) Foreign Application Priority Data

Oct. 31, 2006 (JP) .................... 2006-295451

(51) Int. Cl.
*H02J 7/00* (2006.01)
*H04B 1/034* (2006.01)
*H04M 1/00* (2006.01)

(52) U.S. Cl. ........ 320/106; 320/110; 320/125; 320/137; 320/138; 455/95; 455/100; 455/573

(58) Field of Classification Search ............ 320/106
See application file for complete search history.

(56) References Cited

U.S. PATENT DOCUMENTS

| 5,905,362 | A | * | 5/1999 | Nagano et al. ............... 320/125 |
| 6,005,367 | A | * | 12/1999 | Rohde .......................... 320/106 |
| 6,008,620 | A | * | 12/1999 | Nagano et al. ............... 320/106 |
| 2002/0060554 | A1 | * | 5/2002 | Odaohhara et al. ......... 320/134 |
| 2006/0028168 | A1 | * | 2/2006 | Nishida ....................... 320/106 |

FOREIGN PATENT DOCUMENTS

| JP | 11-27869 | 1/1999 |
| JP | 11-49079 | 2/1999 |
| JP | 11-224694 | 8/1999 |
| JP | 2002-78222 | 3/2002 |
| JP | 2002-359008 | 12/2002 |
| JP | 2003-264934 | 9/2003 |
| JP | 2005-185051 | 7/2005 |

OTHER PUBLICATIONS

Office Action issued Sep. 28, 2010, in Japanese Patent Application No. 2006-295451.

* cited by examiner

*Primary Examiner* — Yalkew Fantu
(74) *Attorney, Agent, or Firm* — Oblon, Spivak, McClelland, Maier & Neustadt, L.L.P.

(57) ABSTRACT

An electronic apparatus is disclosed. The electronic apparatus includes a battery, a main body, a charging section, an obtaining section, and a controlling section. The battery has first information with which charging of the battery is controlled. The main body operates with the battery as a power supply. The charging section charges the battery. The obtaining section obtains the first information from the battery. The controlling section controls the charging section based on the obtained first information and causes the charging section to perform a charging according to another battery.

8 Claims, 16 Drawing Sheets

Table 1

| Cell voltages | Charge amounts |
|---|---|
| 4.2(V) | 100% |
| 4.0(V) | 80% |
| 3.7(V) | 50% |

FIG.13

ELECTRONIC APPARATUS, CHARGING METHOD THEREFOR, AND BATTERY

CROSS REFERENCES TO RELATED APPLICATIONS

The present invention contains subject matter related to Japanese Patent Application JP 2006-295451 filed in the Japanese Patent Office on Oct. 31, 2006, the entire contents of which being incorporated herein by reference.

BACKGROUND OF THE INVENTION

1. Field of the Invention

The present invention relates to an electronic apparatus, such as a laptop personal computer, that is capable of operating with a battery (secondary battery). The present invention also relates to a charging method for an electronic apparatus and to a battery used for an electronic apparatus.

2. Description of the Related Art

Lithium ion batteries widely used for mobile electronic apparatus such as laptop personal computers have a characteristic of which the internal voltage of a battery cell varies depending on the charge amount of the battery (remaining charge amount). Conversely, as the battery is charged, the voltage of the battery cell side rises. For example, when the charge amount is 100% in a battery cell having a nominal voltage of 4.2 V, the voltage of the battery cell side is 4.2 V. When the charge amount is 80%, the voltage of the battery cell becomes 4.0 V. When the charge amount is 50%, the voltage of the battery cell side becomes 3.7 V. In such a manner, the voltage of the battery cell side drops.

On the other hand, lithium ion batteries have a characteristic of which the higher the voltage of a battery cell is, the more easily a cathode active material that composes the battery cell elutes, namely the more remarkably the performance of the battery cell deteriorates. In other words, when a lithium ion battery that has been charged at a high cell voltage is not used for a long period of time, the battery performance deteriorates, namely capacity deterioration progresses. This means that when a lithium ion battery that has been charged at a high cell voltage is not used for a long period of time, the life of the battery becomes short. Thus, when the charge amount of a battery is limited to for example 80% or 50% of its maximum charge amount, the battery can be prevented from becoming the capacity deterioration.

More specifically, it is assumed that the user of a laptop personal computer has two batteries and their capacities are different and that the battery having a large capacity is called the L battery and the other battery having a small capacity is called the S battery. When the maximum charge amount of the battery has been fixed on the personal computer side, it is difficult to satisfy a user's preference of which "the charge amount of the L battery is limited to 80% of its maximum charge amount so as to suppress its capacity deterioration, whereas the charge amount of the S battery is set to 100% so as to prioritize the operation period of time of the battery".

Such a lithium ion battery has a characteristic of which the higher the charge/discharge rate (C) is, the more the charge/discharge cycle characteristic deteriorates. On the other hand, when the charge rate is high, the charge period becomes short. Conversely, when the charge rate is low, the charge period becomes long. In this specification, the charge/discharge rate (C) means the ratio of a charge/discharge current to the nominal current capacity of a battery. 1 C corresponds to the current amount of the nominal current capacity. For example, when the nominal current capacity of a battery is 2600 mAh, 0.5 C corresponds to 1300 mA. The charge/discharge cycle characteristic means a phenomenon or a ratio of which when a battery is repeatedly charged and discharged, the battery capacity deteriorates. Thus, it is common that taking account of the charge period and the charge/discharge cycle characteristic, a proper charge rate is set to the battery.

The main body of a personal computer may support a plurality of types of batteries having different pack capacities that differ in the numbers of parallel cells and/or cell capacities. In this case, it is common that the charge current that flows in the charging circuit is fixed on the main body of the personal computer.

However, when a charge current that is optimum for a battery having a large pack capacity is caused to flow in a battery having a small pack capacity, the charge rate of the battery becomes high. Thus, because of the foregoing reason, the battery life may become short. Conversely, when a charge current that is optimum for a battery having a small pack capacity is caused to flow in a battery having a large pack capacity, the charge period of time may become too long and/or the charge completion may not be detected. In these cases, such abnormalities are likely to occur.

To solve such problems, a technique of changing the charge amount of a battery with a switch disposed on the main body side has been disclosed for example in Japanese Patent Application Laid-Open No. 2002-78222, paragraph 0006, FIG. 3 (hereinafter this document may be referred to as patent document 1). It may be contemplated that such a technique is applied for a charge current.

SUMMARY OF THE INVENTION

However, in the technique of which the charge amount and the charge current are changed with the switch disposed on the main body side, whenever the battery connected to the main body is replaced with another one, it is necessary to change the setting of the battery newly connected to the main body. Thus, the usability of the battery is impaired. In addition, the user may forget to change the setting of the battery or may not be aware of it.

In view of the foregoing, it would be desirable to provide an electronic apparatus, a charging method therefor, and a battery therefor that allow the battery to be charged in a user's desired condition without his or her awareness.

According to an embodiment of the present invention, there is provided an electronic apparatus. The electronic apparatus includes a battery, a main body, a charging section, an obtaining section, and a controlling section. The battery has first information with which charging of the battery is controlled. The main body operates with the battery as a power supply. The charging section charges the battery. The obtaining section obtains the first information from the battery. The controlling section controls the charging section based on the obtained first information and causes the charging section to perform a charging according to another battery.

According to an embodiment of the present invention, the battery side has the first information with which the charging of the battery is controlled. The charging of the battery is controlled according to the first information. Thus, the battery can be charged in a user's desired condition without his or her awareness. In this case, it is most preferred that the first information be rewritable from the main body side. However, as will be described later, the first information includes for example a serial number stored in the battery.

According to this embodiment of the present invention, the first information may be a maximum charge amount of the battery. The controlling section may control the charging section to stop charging the battery when a charge amount of the battery has become the maximum charge amount.

According to this embodiment of the present invention, the battery can be charged up to its maximum charge amount without a user's awareness.

According to this embodiment of the present invention, the maximum charge amount of the battery as the first information may be capable of being set to a desired value for the battery.

According to this embodiment of the present invention, the user can set the maximum charge amount of each battery to his or her desired value. Thereafter, the battery can be charged up to his or her desired maximum charge amount without his or her awareness.

According to an embodiment of the present invention, after the controlling section has controlled the charging section to stop charging the battery, when the charge amount of the battery has decreased from the maximum charge amount by a predetermined charge amount, the controlling section may control the charging section to restart charging the battery.

With respect to charge/discharge cycles performed near a threshold value of the maximum charge amount, batteries of particular type use different remaining charge amount management and calculation methods in the charge mode and the discharge mode. In this case, when the charge mode is changed to the discharge mode, the charge amount (remaining charge amount information that the EC can obtain from the battery or remaining charge amount information that the battery internally manages) may decrease. For example, when the target charge amount has been set to 80% and the charging of the battery is stopped with a charge amount of 80%, the charge mode is changed to the discharge mode on the battery side. In this case, the remaining charge amount of the battery may become 79%. When the EC side starts recharging the battery, the charge amount becomes 80%. As a result, the EC side stops charging the battery. Thus, charging on/off states alternately occur. When the battery is repeatedly charged and discharged, it will deteriorate. Thus, the battery is charged and discharged with a hysteresis. In other words, after the charging of the battery is stopped, it be prevented from being recharged until the remaining charge amount becomes smaller than for example 78%.

According to this embodiment of the present invention, the electronic apparatus may include a storing section. The storing section may correlatively store a unique number of the battery and the maximum charge amount of the battery. The first information may be the unique number of the battery. The controlling section may obtain the maximum charge amount of the battery corresponding to the unique number of the battery as the first information from the storing section and control the charging section to stop charging the battery when the charge amount of the battery has become the maximum charge amount of the battery.

According to this embodiment of the present invention, the unique number of the battery is for example a serial number stored in the battery. In this embodiment, since the unique number of the battery is used as the first information, it is not necessary to cause the battery side to have special information.

According to this embodiment of the present invention, the first information may be a charge current of the battery. The controlling section may control the charging section based on the charge current of the battery as the first information and cause the charging section to perform a charging according to another battery.

According to this embodiment of the present invention, the battery can be charged with a user's desired charge current without his or her awareness.

According to this embodiment of the present invention, the electronic apparatus may include a setting section. The setting section may set a charge current. The controlling section may control and cause the charging section to charge the battery based on a predetermined charge current in a normal state and based on the charge current of the battery as the first information when the setting section has set the charge current.

According to this embodiment of the present invention, the battery can be charged according to the first information that the user has selected. For example, the user can select a normal charge mode or a charge mode according to the first information to charge the battery.

According to this embodiment of the present invention, the electronic apparatus may include a setting section. The setting section may set the charge current of the battery to a quick charge value with which the controlling section controls the charging section to more quickly charge the battery than a normal charge state. The controlling section may control and cause the charging section to charge the battery based on the quick charge value when the setting section has set the charge current of the battery to the quick charge value.

According to this embodiment of the present invention, the battery can be quickly charged according to a user's request.

According to an embodiment of the present invention, there is provided a method of charging an electronic apparatus which operates with a chargeable battery as a power supply. The battery is caused to have first information with which charging of the battery is controlled. The first information is obtained from the battery. A charging is performed according to another battery based on the obtained first information.

According to an embodiment of the present invention, the battery side has the first information with which the charging of the battery is controlled. The charging of the battery is controlled according to the first information. Thus, the battery can be charged in a user's desired condition without his or her awareness.

According to this embodiment of the present invention, the first information may be a maximum charge amount of the battery. Charging of the battery may be stopped when a charge amount of the battery has become the maximum charge amount.

According to this embodiment of the present invention, the user can set the maximum charge amount of each battery to his or her desired value. Thereafter, the battery can be charged up to his or her desired maximum charge amount without his or her awareness.

According to this embodiment of the present invention, the maximum charge amount of the battery as the first information may be capable of being set to a desired value for the battery.

According to this embodiment of the present invention, the user can set the maximum charge amount of each battery to his or her desired value. Thereafter, the battery can be charged up to his or her desired maximum charge amount without his or her awareness.

According to this embodiment of the present invention, the first information may be a charge current of the battery. A charging may be performed according to another battery based on the charge current of the battery as the first information.

According to this embodiment of the present invention, the battery can be charged with a user's desired charge current without his or her awareness.

According to an embodiment of the present invention, there is provided a battery. The battery includes a main body and a storing section. The storing section stores first information with which charging of the main body of the battery is controlled.

According to this embodiment of the present invention, each battery can be charged in a user's desired condition without his or her awareness.

According to this embodiment of the present invention, the first information may be a maximum charge amount of the main body of the battery.

According to this embodiment of the present invention, the user can set the maximum charge amount of each battery to his or her desired value.

According to this embodiment of the present invention, the first information may be a charge current of the main body of the battery.

According to this embodiment of the present invention, the battery can be charged with a user's desired charge current without his or her awareness.

According to this embodiment of the present invention, each battery can be charged in a user's desired condition without his or her awareness.

These and other objects, features and advantages of the present invention will become more apparent in light of the following detailed description of a best mode embodiment thereof, as illustrated in the accompanying drawings.

BRIEF DESCRIPTION OF DRAWINGS

The invention will become more fully understood from the following detailed description, taken in conjunction with the accompanying drawings, wherein similar reference numerals denote similar elements, in which:

FIG. 13 is a table showing the relationship between cell voltages and charge amounts;

DESCRIPTION OF PREFERRED EMBODIMENTS

Next, with reference to the accompanying drawings, embodiments of the present invention will be described.

Figure 1:
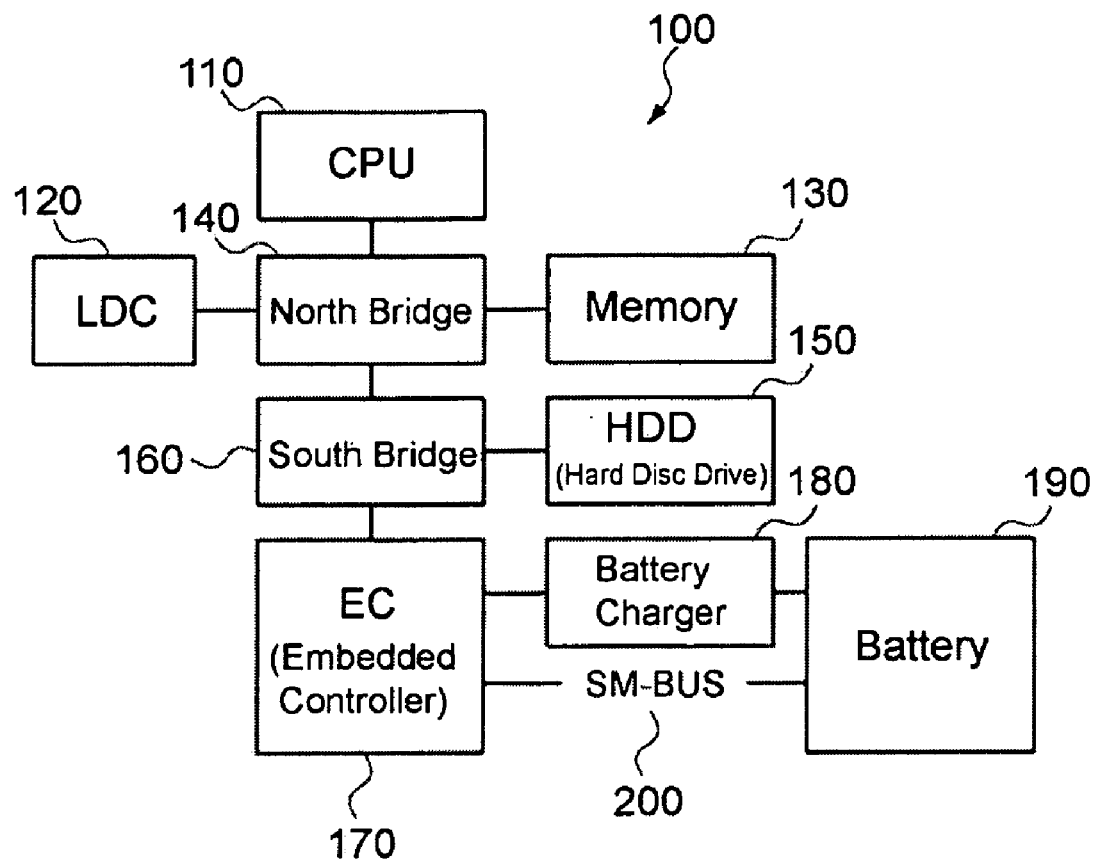
FIG. 1 is a block diagram showing the structure of a laptop personal computer as an electronic apparatus according to an embodiment of the present invention.

FIG. 1 is a block diagram showing the structure of a laptop personal computer as an electronic apparatus according to an embodiment of the present invention.

As shown in FIG. 1, the personal computer that is designated by reference numeral 100 is mainly composed of a CPU (Central Processing Unit) 110, a liquid crystal display device (LCD) 120, a memory 130, a north bridge 140, a hard disk drive (HDD) 150, a south bridge 160, an embedded controller (EC) 170, a battery charger 180, and a battery 190. The battery 190 can be freely attached to and detached from a main body of the personal computer 100. The main body of the personal computer 100 means the entire personal computer 100 from which the battery 190 is removed.

The CPU 110 totally controls the entire personal computer 100. The liquid crystal display device 120 displays a screen for the personal computer 100. The memory 130 stores necessary programs. The memory 130 is also used as a working memory for the CPU 110. The north bridge 140 manages the liquid crystal display device 120, the memory 130, and so forth. The hard disk drive 150 stores data, programs, and so forth. The south bridge 160 manages the hard disk drive 150 and so forth.

The embedded controller 170 is a device that the personal computer 100 has. In the personal computer 100, the embedded controller 170 mainly has the following three functions. The embedded controller 170 is originally a device that performs a keyboard related process and a process for power supply management defined in the ACPI (Advanced Configuration and Power Interface). However, the embedded controller 170 can accomplish additional functions of this embodiment using the remaining resource of the device. In other words, the embedded controller 170 provides:

(1) a keyboard controller (KBC), which controls the keyboard,
(2) an ACPI/EC, which manages the power supply according to the ACPI, and
(3) a programmable IO controller, which interfaces with utility software.

When the programmable IO controller of the embedded controller 170 communicates with utility software that is a man-machine interface, the user can obtain information from the utility software. Conversely, the programmable IO controller can visually provide information of the embedded controller 170 to the user through the utility software.

Figure 2:
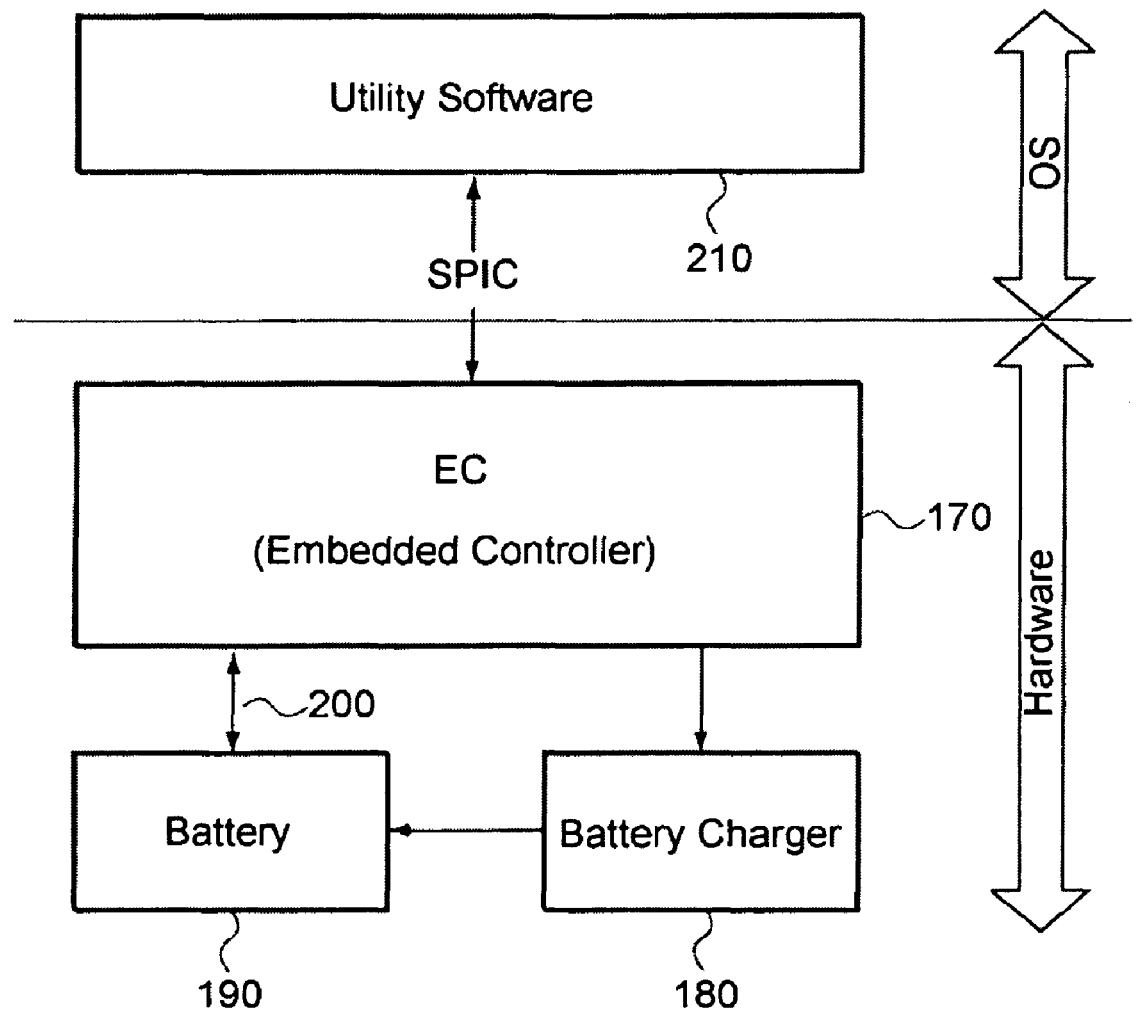
FIG. 2 is a block diagram showing the relationship between an embedded controller, a battery, and a battery charger on a hardware side and utility software on an operating system (OS) side according to an embodiment of the present invention.

FIG. 2 is a block diagram showing the relationship between the embedded controller 170, the battery 190, and the battery charger 180 on the hardware side and utility software 210 on the operating system (OS) side.

The embedded controller 170 has the following functions for the battery 190:
(1) to obtain the remaining charge amount from the battery 190 through an SM-bus (system management bus),
(2) to stop charging the battery 190 regardless of the remaining charge amount with ON/OFF control signals for the battery charger 180, and
(3) to detect the presence or absence (attached state or detached state) of the battery 190.

The battery charger 180 charges the battery 190.

The utility software 210 is software that operates on the OS. The utility software 210 has the following major roles of:
(1) functioning as a man-machine interface through which the user can set a target charge amount of the battery,
(2) visually indicating the current setting values, and
(3) informing the embedded controller 170 of the changed settings when the settings are changed.

Figure 3:
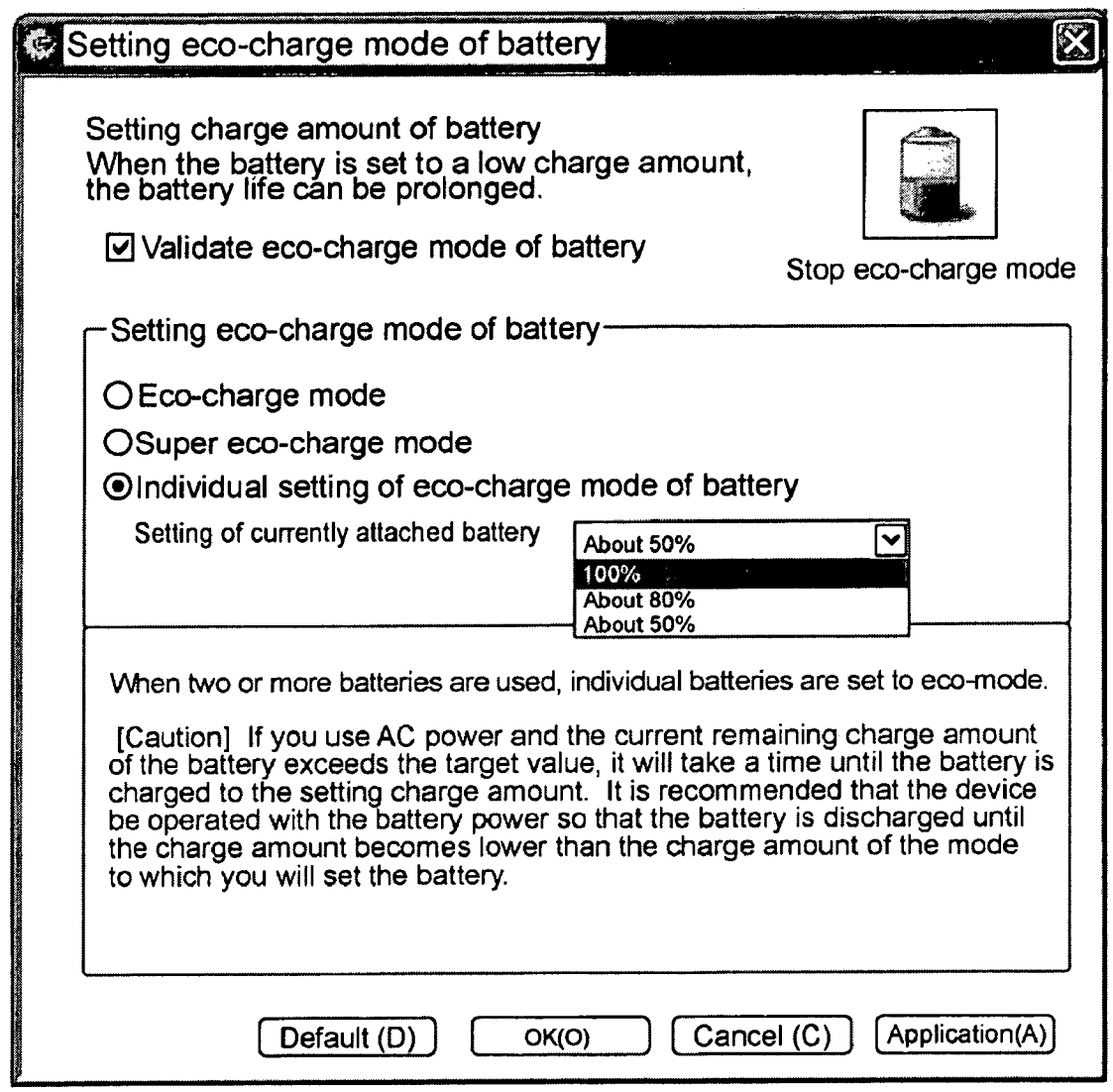
FIG. 3 is a schematic diagram showing an example of a utility screen according to an embodiment of the present invention.

FIG. 3 is a schematic diagram showing an example of a utility screen 220 that is displayed on the liquid crystal display device 120 by the utility software 210.

The user can set the maximum charge amount of the battery 190 attached to the main body of the personal computer 100 to 100%, 80%, or 50% on the screen 220 shown in FIG. 3. The utility software 210 informs the embedded controller 170 of the value that has been set on the utility screen 220.

Figure 4:
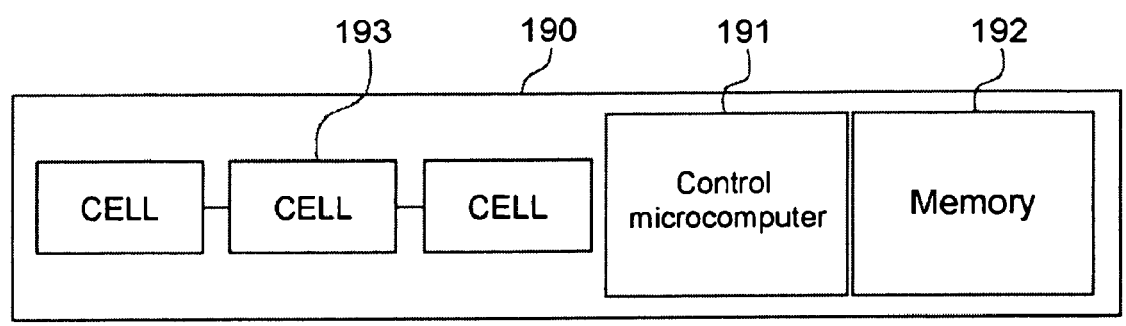
FIG. 4 is a first schematic diagram showing the internal structure of a battery according to an embodiment of the present invention.
Figure 5:
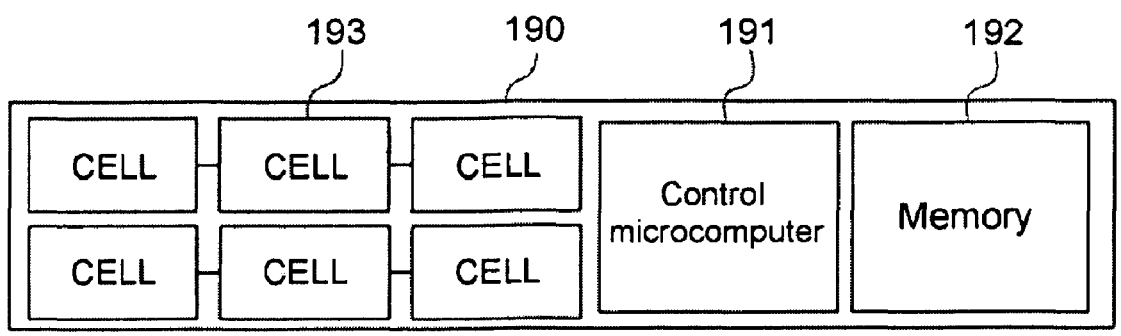
FIG. 5 is a second schematic diagram showing the internal structure of a battery according to an embodiment of the present invention.

FIG. 4 and FIG. 5 are schematic diagrams showing the internal structure of the battery 190.

As shown in FIG. 4 and FIG. 5, the battery 190 is mainly composed of a control microcomputer 191, a memory 192, and a plurality of cells 193.

The control microcomputer 191 has roles of managing the remaining charge amount of the battery 190 and providing various information of the battery 190 to the outside through the SM-bus 200.

The memory 192 is a nonvolatile memory such as an EEPROM. Various management information can be stored to and read from the memory 192.

The battery 190 shown in FIG. 4 has the cells 193 arranged in "three series and one parallel". The battery 190 shown in FIG. 5 has the cells 193 arranged in "three series and two parallels". Since the number of cells of the battery 190 shown in FIG. 5 is twice that of the battery 190 shown in FIG. 4, the maximum capacity of the former is twice that of the latter. Thus, when the battery charge current has been optimized for the battery 190 shown in FIG. 5, it is necessary to halve the current of the battery 190 shown in FIG. 4. Otherwise, the battery 190 shown in FIG. 4 would deteriorate. Conversely, when the battery charge current has been optimized for the battery 190 shown in FIG. 4, it is necessary to double the current of the battery 190 shown in FIG. 5. Otherwise, the charge period of time would become long.

Figure 6:
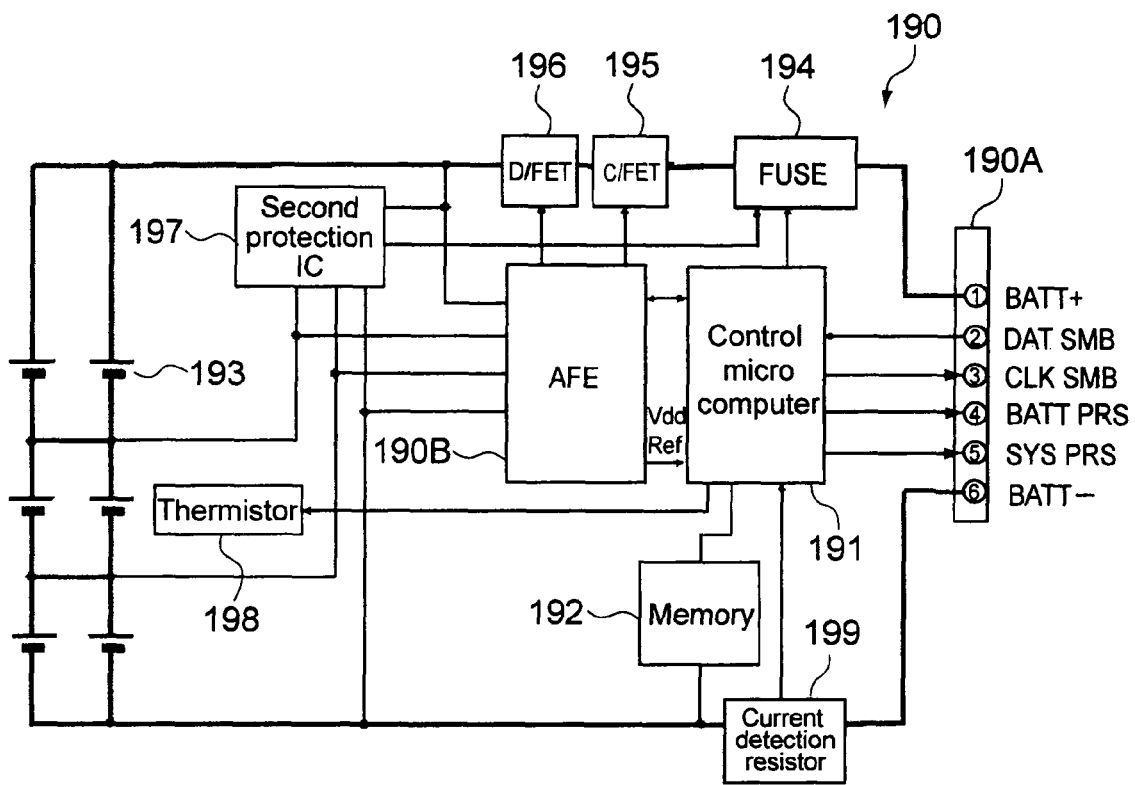
FIG. 6 is a block diagram showing details of the battery shown in FIG. 5.

FIG. 6 is a block diagram showing details of the battery 190 shown in FIG. 5.

As shown in FIG. 6, besides the control microcomputer 191, the memory 192, and the six cells 193, the battery 190 includes a connection terminal 190A connected to the main body side, a fuse 194, a charge control switch (FET) 195, a discharge control switch (FET) 196, an over-voltage monitor second protection IC 197, a cell temperature monitor thermistor 198, a current detection resistor 199, and an analog front end (AFE) 190B that is a signal interface between an analog circuit and the control microcomputer 191.

Figure 7:
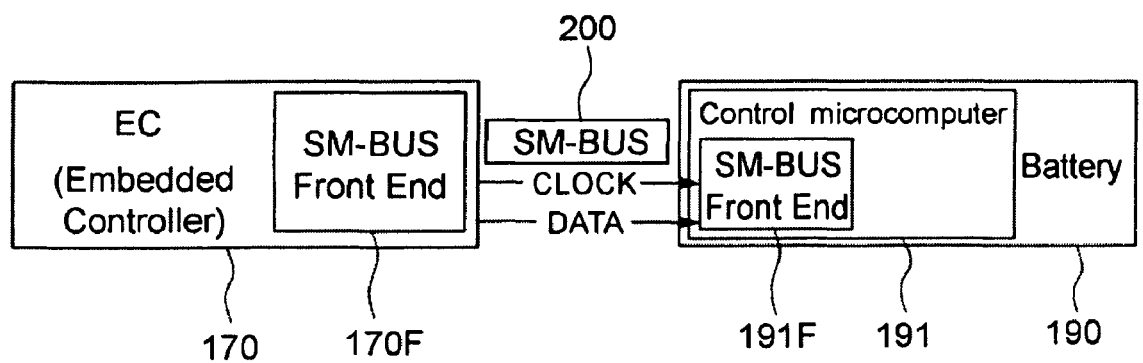
FIG. 7 is a schematic diagram describing an outline of communications made between the embedded controller and the battery according to an embodiment of the present invention.

FIG. 7 is a schematic diagram describing an outline of communications made between the embedded controller 170 and the battery 190.

Various information defined in the Smart Battery System can be exchanged between the embedded controller 170 and the battery 190. In this embodiment, the SM-bus 200 is used as a communication specification for information exchange.

The Smart Battery System is a battery management standard. According to the Smart Battery System, for example, the remaining charge amount of a secondary battery is calculated and the charge and discharge currents are monitored. The Smart Battery System can be built in battery packs for laptop personal computers, digital still cameras, and electric cars, and so forth.

The SM-bus 200 is a two-line (CLOCK and DATA) bus designed for communications with components (particularly, semiconductor ICs) of the personal computer. Individual devices connected to the bus are assigned unique addresses. With these addresses, peer-to-peer communications can be made.

In this embodiment, the battery remaining charge amount and charge current information are exchanged between an SM-bus front end 170F of the embedded controller 170 and an SM-bus front end 191F of the control microcomputer 191 through the SM-bus 200 according to the Smart Battery System. In addition, custom commands are added and the maximum charge amount is managed according to the definitions of the Smart Battery System.

Figure 8:
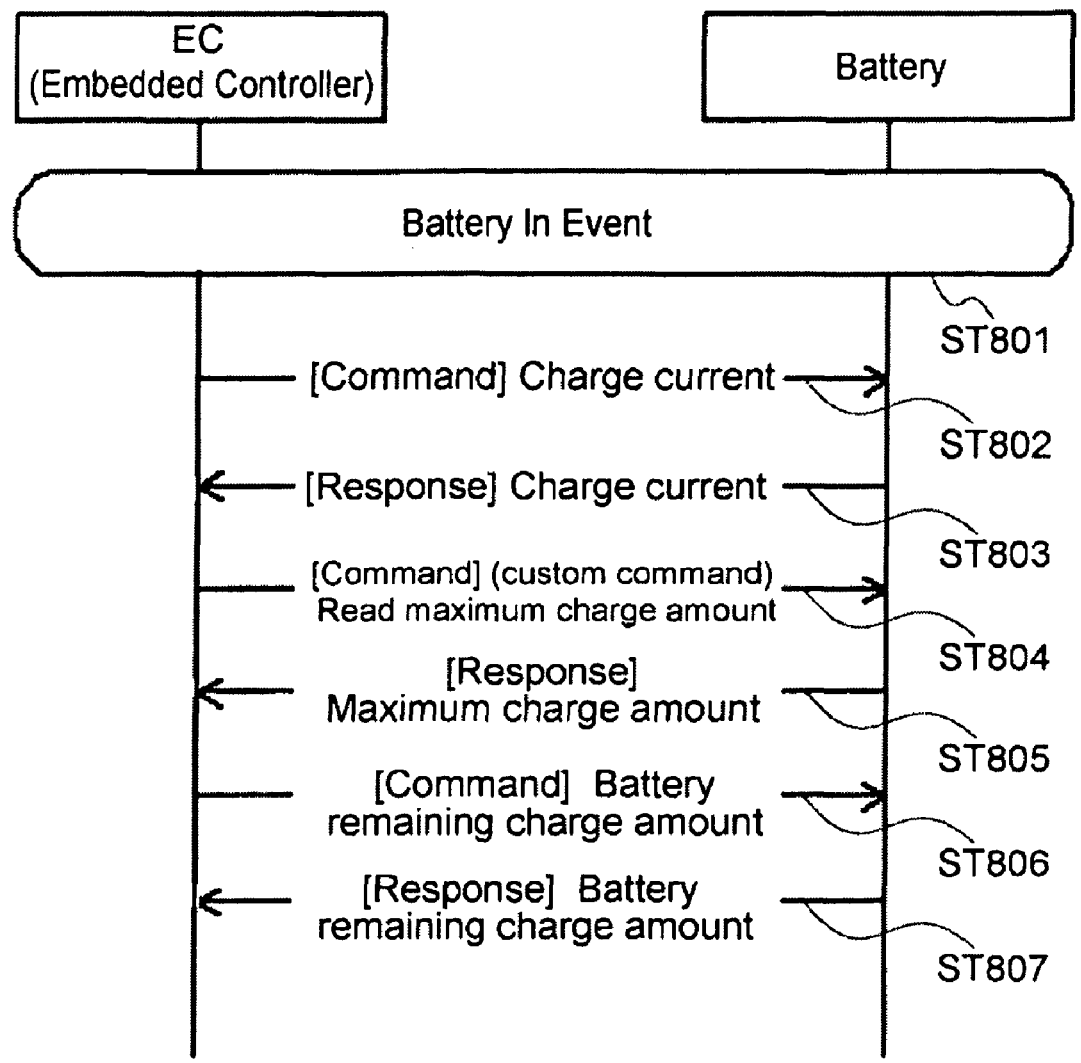
FIG. 8 is a timing chart showing exemplary communications made through an SM-bus in the case that a battery is attached to a main body of a personal computer according to an embodiment of the present invention.

FIG. 8 is a timing chart showing exemplary communications made through the SM-bus 200 in the case that the battery 190 is connected to the main body of the personal computer 100.

When the embedded controller 170 and the battery 190 communicate with each other through the SM-bus 200, the embedded controller 170 side functions as a master device, whereas the battery 190 side functions as a slave device. In other words, the battery 190 provides response information corresponding to command information issued from the embedded controller 170. When the embedded controller 170 issues "Relative State of Charge" command (to obtain the remaining charge amount of the battery) defined in the Smart Battery System, the battery 190 sends its remaining charge amount back to the embedded controller 170, which functions as the master device. In other words, the embedded controller 170 can obtain various information from the battery 190 according to the definitions of the Smart Battery System. In this embodiment, the definitions of the Smart Battery System are used.

When the battery 190 is connected to the main body of the personal computer 100, an event occurs (at step 801).

First, the embedded controller 170 issues a command to the battery 190 so as to obtain a charge current (at step 802).

The battery 190 sends a charge current as first information stored in the memory 192 back to the embedded controller 170 (at step 803).

The embedded controller 170 sets the charge current of the battery 190 according to the obtained charge current information.

Thereafter, the embedded controller 170 issues a command to the battery 190 so as to obtain the maximum charge amount (at step 804).

When the battery 190 has received the command, the battery 190 sends the maximum charge amount as the first information stored therein back to the embedded controller 170 (at step 805).

The embedded controller 170 sets the maximum charge amount of the battery 190 according to the obtained maximum charge amount information.

Thereafter, the embedded controller 170 issues a custom command to the battery 190 so as to obtain its remaining charge amount (at step 806).

When the battery 190 has received this command, the battery 190 sends the current remaining charge amount back to the embedded controller 170 (at step 807).

The embedded controller 170 compares the battery remaining charge amount obtained at step 807 with the maximum charge amount obtained at step 805. When the battery remaining charge amount is equal to or larger than a predetermined target value, the embedded controller 170 causes the battery charger 180 to stop charging the battery 190.

Since the remaining charge amount of the battery 190 varies time by time, while the battery 190 is connected to the main body of the personal computer 100, step 806 and step 807 are periodically executed.

Figure 9:
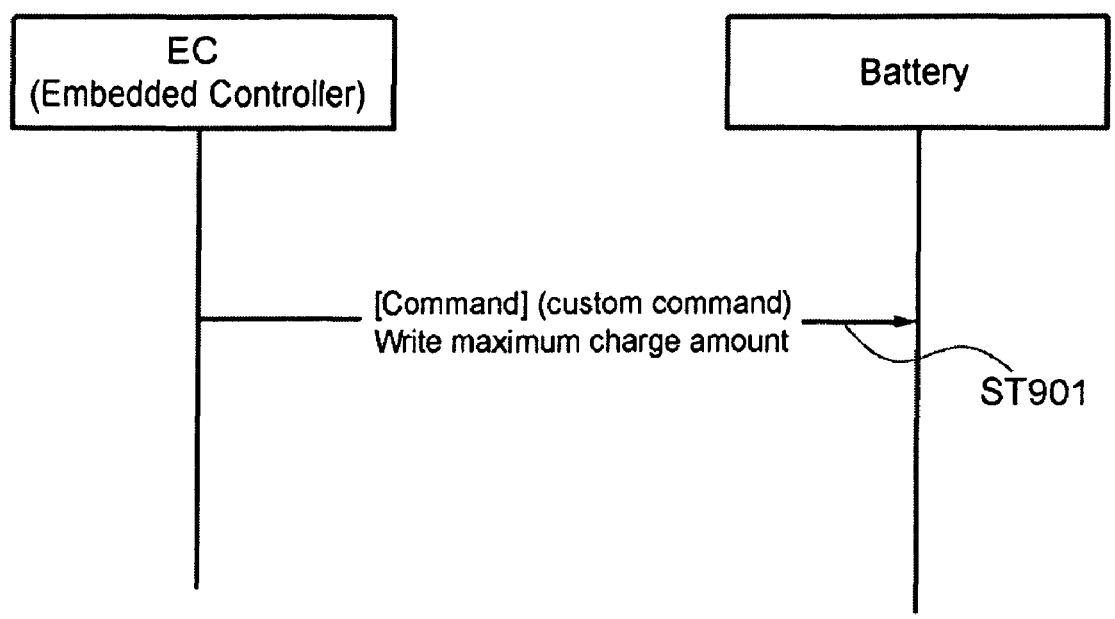
FIG. 9 is a timing chart showing an operation that a battery performs to obtain the maximum charge amount according to an embodiment of the present invention.

FIG. 9 is a timing chart showing an operation that the battery 190 performs to record the maximum charge amount.

In this embodiment, the embedded controller 170 causes the battery 190 to record the maximum charge amount using a custom command. The battery 190 side treats the foregoing maximum charge amount as data. In other words, the battery 190 side only takes a role of storing the maximum charge amount to the memory (nonvolatile memory) 192 since the embedded controller 170 side controls the charge ON/OFF operations.

Specifically, when the embedded controller 170 side causes the battery 190 side to store data (maximum charge amount), the embedded controller 170 issues a custom command to the battery 190 so as to write the maximum charge amount (at step 901).

The battery 190 side stores data (maximum charge amount) obtained according to the custom command to the memory (nonvolatile memory) 192.

Figure 10:
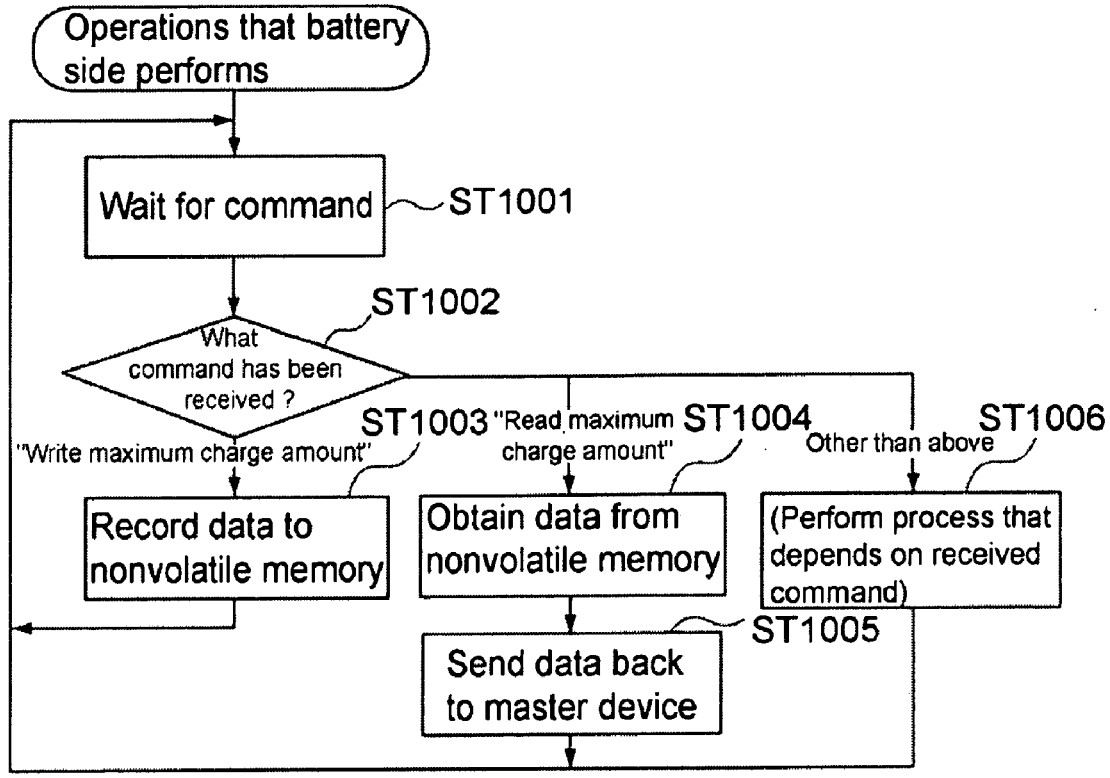
FIG. 10 is a flow chart showing an operation performed on the battery side that has received a custom command ("write maximum charge amount") or the like according to an embodiment of the present invention.

FIG. 10 is a flow chart showing an operation that the battery 190 side performs according to the custom command ("write maximum charge amount").

When the battery 190 side has received the custom command ("write maximum charge amount"), the battery 190 side stores data obtained according to the command to the memory (nonvolatile memory) 192 such as an EEPROM.

When the battery 190 side is in a command waiting state and has received a command from the embedded controller 170 (at step 1001), the battery 190 side performs a predetermined operation depending on the received command (at step 1002).

(1) When the received command is "write maximum charge amount", the battery 190 side stores data to the memory (nonvolatile memory) 192 (at step 1003).

(2) When the received command is "read maximum charge amount", the battery 190 side obtains data of the maximum charge amount from the memory (nonvolatile memory) 192 (at step 1004) and sends the data back to the embedded controller 170 side, which functions as the master device (at step 1005).

(3) When the received command is other than the above commands, the battery 190 side performs a process depending on the received command (at step 1006).

Figure 11:
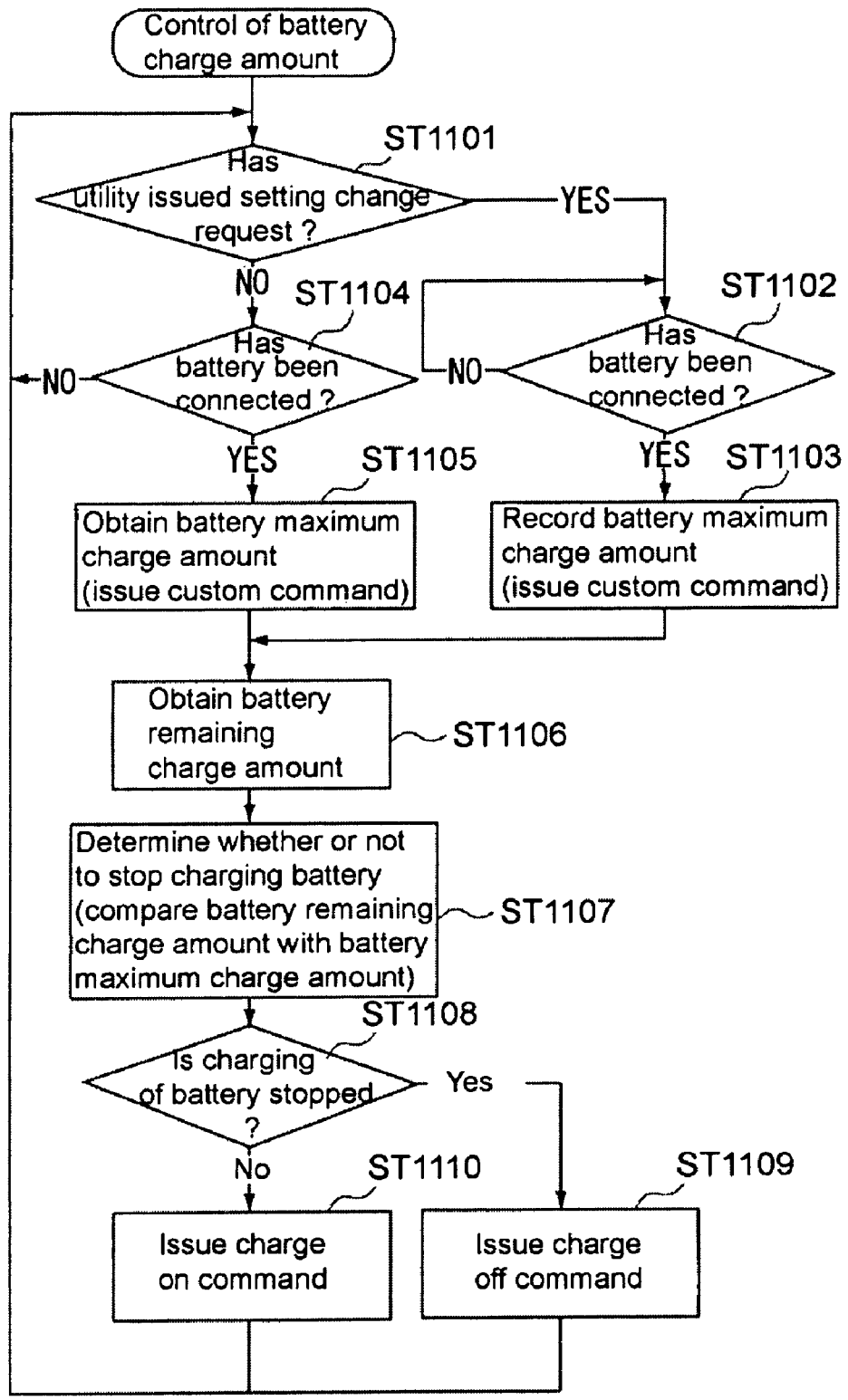
FIG. 11 is a flow chart showing an operation that the embedded controller side performs to control the battery charger to stop charging the battery with a particular battery charge amount according to an embodiment of the present invention.

FIG. 11 is a flow chart showing an operation that the embedded controller 170 side performs to cause the battery charger 180 to stop charging the battery 190 with a particular battery charge amount.

In this embodiment, when the battery charger is caused to stop charging the battery with a particular battery charge amount, the following two cases may be contemplated.

Case 1: The battery has been connected (1) After the embedded controller 170 has detected that the battery 190 has been connected to the main body of the personal computer 100, the embedded controller 170 issues a battery custom command to the battery 190 and obtains target charge amount information from the battery 190.

(2) The embedded controller 170 periodically reads the remaining charge amount from the battery 190 through the SM-bus 200.

(3) The embedded controller 170 compares the target charge amount obtained at step (1) with the charge amount of the battery 190 obtained at step (2). When the battery remaining charge amount is equal to or larger than the target charge amount, the embedded controller 170 causes the battery charger 180 to stop charging the battery 190.

Case 2: The setting of the target charge amount has been changed through the utility software (1) The utility software 210 issues a setting change request and a target charge amount to the embedded controller 170.

(2) The embedded controller 170 writes the target charge amount information obtained from the utility software 210 to the battery custom command.

(3) The embedded controller 170 periodically reads the remaining charge amount from the battery 190 through the SM-bus 200.

(4) The embedded controller 170 compares the target charge amount obtained at step (1) with the charge amount of the battery 190 obtained at step (3). When the battery remaining charge amount is equal to or larger than the target charge amount, the embedded controller 170 causes the battery charger 180 to stop charging the battery 190.

Next, a control operation that the embedded controller 170 side performs will be described according to a flow chart shown in FIG. 11.

The embedded controller 170 side determines whether or not the utility software 210 has issued a request so as to change a target charge amount (at step 1101).

When the utility software 210 has issued the request, the embedded controller 170 waits until the battery 190 is connected to the main body of the personal computer 100 (at step 1102).

When the battery 190 has been connected to the main body of the personal computer 100, the embedded controller 170 issues a custom command to the battery 190 so as to record the battery maximum charge amount (at step 1103).

When the utility software 210 has not issued the request, likewise, the embedded controller 170 waits until the battery 190 is connected to the main body of the personal computer 100 (at step 1104).

When the battery 190 has been connected to the main body of the personal computer 100, the embedded controller 170 issues a custom command to the battery 190 so as to obtain the battery maximum charge amount (at step 1105).

Thereafter, the flow advances to step 1106. At step 1106, the embedded controller 170 obtains the battery remaining charge amount. Thereafter, the embedded controller 170 compares the battery remaining charge amount with the target charge amount and determines whether or not to stop charging the battery 190 (at step 1107). When the embedded controller 170 has determined to stop charging the battery 190 (at step 1108), the embedded controller 170 issues a charge off command to the battery charger 180 (at step 1109). In contrast, when the embedded controller 170 has determined to charge the battery 190, the embedded controller 170 issues a charge on command to the battery charger 180 (at step 1110).

Figure 12:
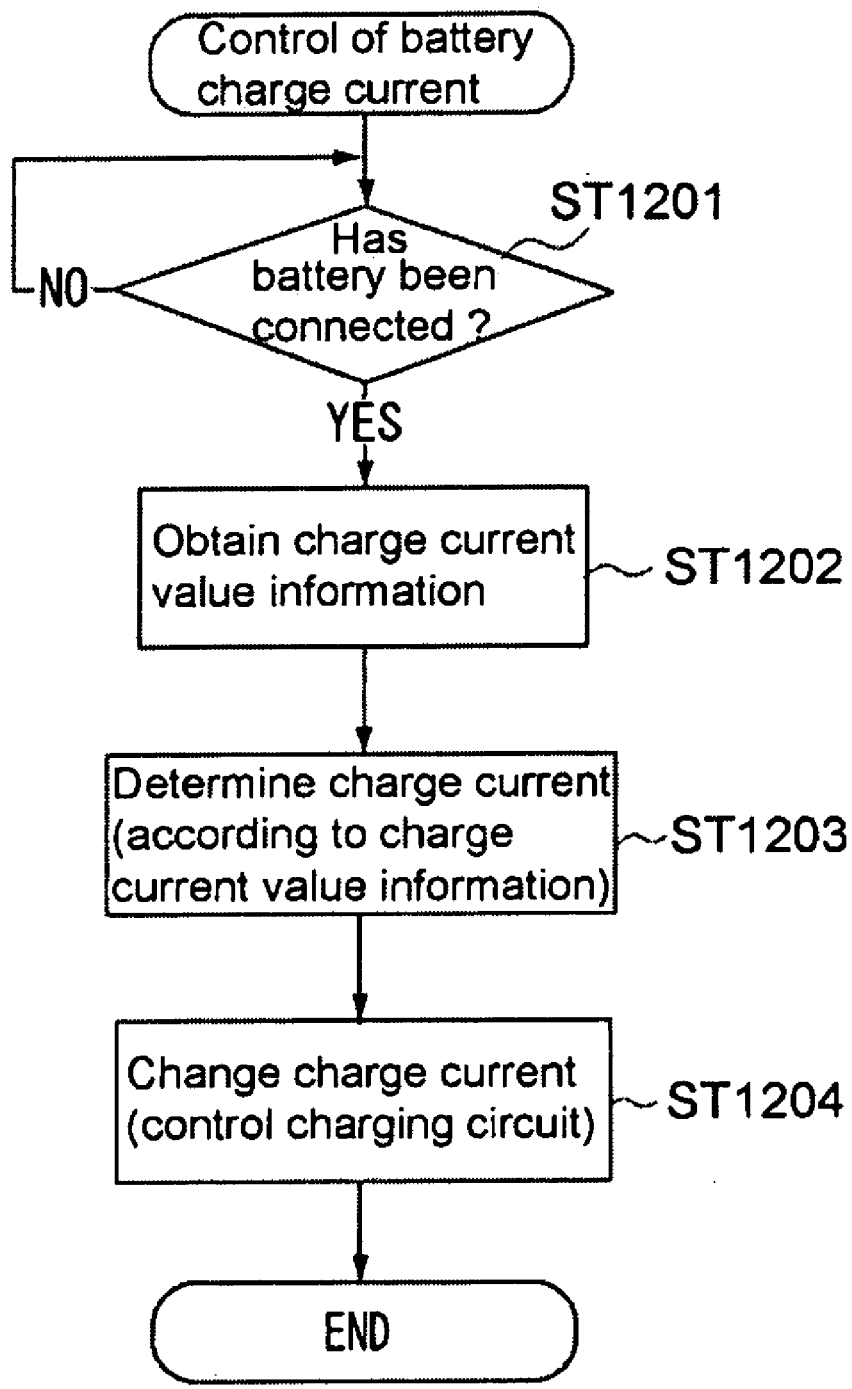
FIG. 12 is a flow chart showing an operation performed on the embedded controller side that controls a charge current of the battery according to an embodiment of the present invention.

FIG. 12 is a flow chart showing an operation that the embedded controller 170 side performs to control a charge current of the battery 190.

The embedded controller 170 side waits until the battery 190 is connected to the main body of the personal computer 100 (at step 1201).

When the battery 190 has been connected to the main body of the personal computer 100, the embedded controller 170 obtains charge current information as first information from the battery 190 side (at step 1202).

The embedded controller 170 determines the charge current according to the obtained charge current information (at step 1203) and causes the battery charger 180 to change the charge current according to the determined result (at step 1204).

As described above, in the battery charge control technique of this embodiment, the battery side has the battery maximum charge amount and the charge current as first information with which charging of the battery is controlled. The charge amount and charge current of the battery are controlled according to the battery maximum charge amount and charge current as the first information. Thus, the battery 190 can be charged in a user's desired condition without his or her awareness.

Figure 14:
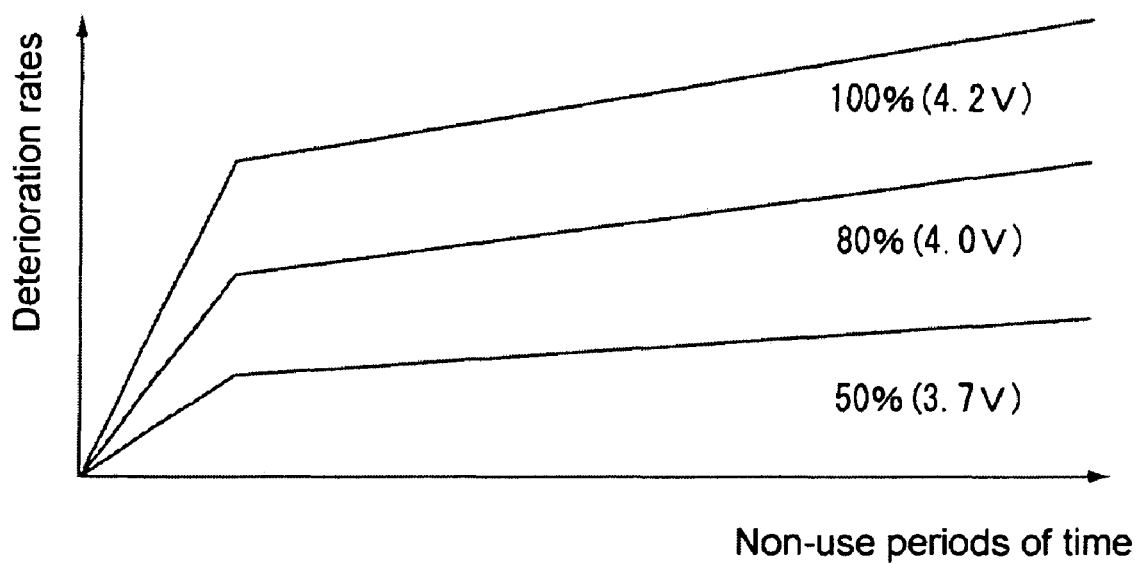
FIG. 14 is a graph showing the relationship between non-use periods of time and deterioration rates in the case that the charge amount is constant.

FIG. 13 is a table showing an example of the relationship between charge amounts and voltages of a battery cell having a nominal voltage of 4.2 V. However, the relationship between voltages and charge amounts depends to some extent on the characteristics of the battery. The lithium ion batteries have a characteristic of which the higher the battery cell voltage is, the more easily a cathode active material elutes, namely the more remarkably the performance of the battery deteriorates. In other words, when a battery whose cell voltage is high is not used for a long period of time, the performance of the battery deteriorates. As a result, the capacity deterioration progresses and the battery life shortens. FIG. 14 shows charge capacity deterioration rates of a battery that is not used for a long period of time in each of charge amounts 100% (4.2 V), 80% (4.0 V), and 50% (3.7 V). When the battery charge amount is limited to for example 80% or 50% of the maximum charge amount (100%), the capacity deterioration can be suppressed. In this embodiment, a charge amount can be set to each battery. More specifically, when the user has a plurality of batteries, he or she can set a charge amount of each battery according to its application of which he or she prioritizes its long service life or its long operation period of time. When the maximum charge amount as the first information has been stored to the battery side, the maximum charge amount is set to the battery without a user's awareness. Thus, the usability of the battery is improved.

Figure 15:
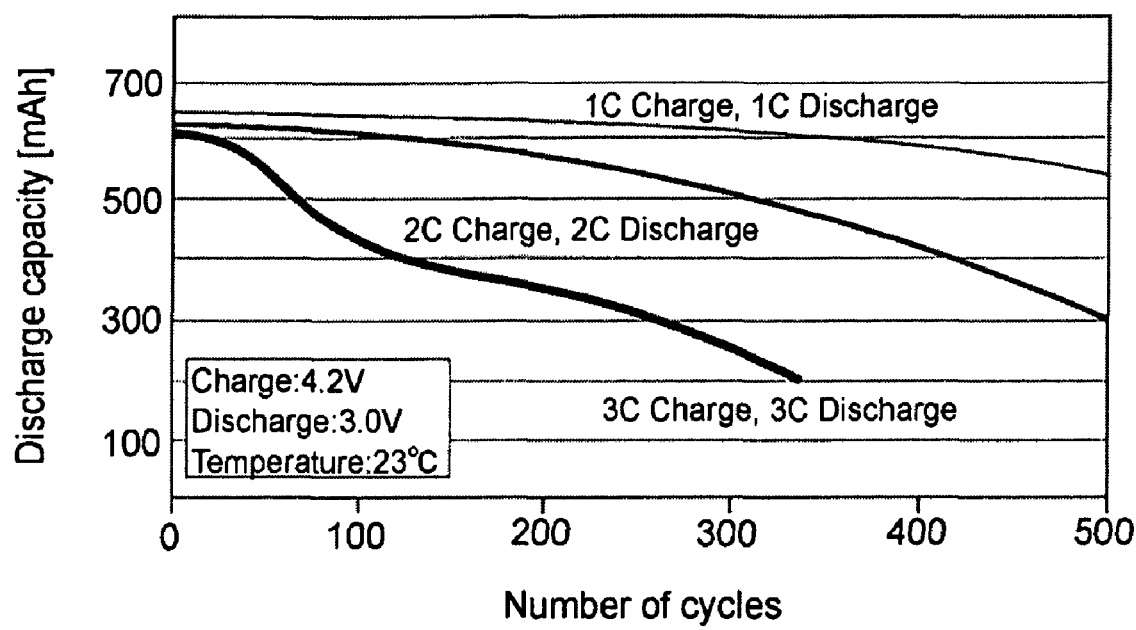
FIG. 15 is a graph showing the relationship between charge/discharge rates and charge/discharge cycles.
Figure 16:
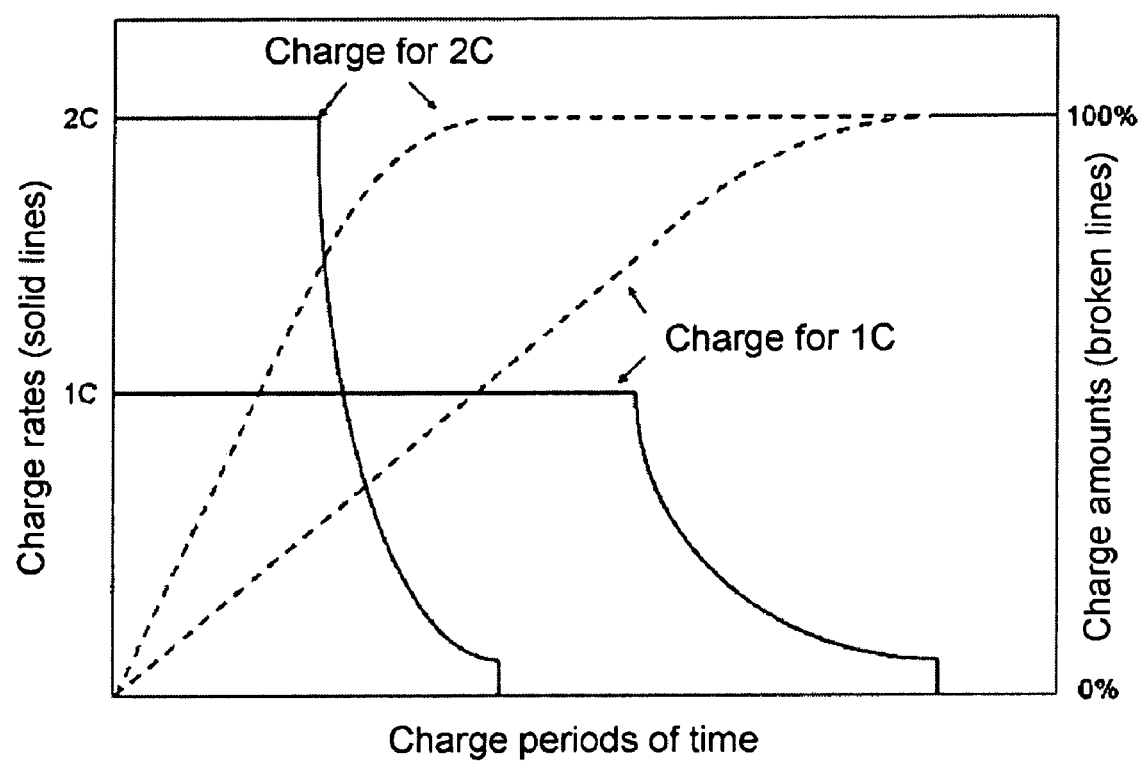
FIG. 16 is a graph showing the relationship between charge/discharge rates and charge periods of time.

As described above, the lithium ion batteries have a characteristic of which the larger the charge/discharge rate is, the further the charge/discharge cycle characteristic deteriorates. FIG. 15 is a graph showing the relationship between charge/discharge cycles and charge/discharge rates of a regular lithium ion battery. From FIG. 15, it is clear that the higher the charge/discharge rate is, the more the charge amount decreases and the more the battery life shortens. In addition, generally, as shown in the graph of FIG. 16, the lithium ion batteries have a characteristic of which the higher the charge rate is, the shorter the charge period of time becomes and conversely the lower the charge rate is, the longer the charge period of time becomes. Optimum charge currents can be supplied to a plurality of batteries having different capacities. In this embodiment, since the user can set a charge current to each battery, deterioration of the battery due to charge/discharge cycles can be suppressed and the battery life can be prolonged or the charge period of time of the battery can be shortened with a proper charge current. Since the charge current as the first information is stored to the battery side, when the battery is connected to the main body of the personal computer 100, the charge current is set to the battery without a user's awareness. Thus, the usability of the battery is improved.

The present invention is not limited to the foregoing embodiments. Rather, their various modifications may be contemplated.

When it is difficult to add a custom command for example for the maximum charge amount to a battery, the same function can be accomplished by the following technique. Unique information (for example, serial number) of a battery having a nonvolatile memory such as an EEPROM and the maximum charge amount of the battery are correlated and stored in the main body of the personal computer such that they can be accessed by the EC. In other words, information of which unique information (for example, serial number) and the maximum charge amount have been correlated is stored in and managed by a nonvolatile memory of the main body of the personal computer. A battery generally used in a laptop personal computer has an internal memory. The internal memory stores the serial number of the battery. The serial number can be read through the SM-bus or the like. By correlating the serial number and the maximum charge amount of a battery, it can be identified.

With respect to charge/discharge cycles performed near a threshold value, batteries of particular type use different remaining charge amount management and calculation methods in the charge mode and the discharge mode. In this case, when the charge mode is changed to the discharge mode, the charge amount (remaining charge amount information that the EC can obtain from the battery or remaining charge amount information that the battery internally manages) may decrease. For example, when the target charge amount has been set to 80% and the charging of the battery is stopped with a charge amount of 80%, the charge mode is changed to the discharge mode on the battery side. In this case, the remaining charge amount of the battery may become 79%. When the EC side starts recharging the battery, the charge amount becomes 80%. As a result, the EC side stops charging the battery. Thus, charging on/off states alternately occur. When the battery is repeatedly charged and discharged, it will deteriorate. Thus, it is preferred that the battery be charged and discharged with a hysteresis. In other words, it is preferred that after the charging of the battery is stopped, it be prevented from being recharged until the remaining charge amount becomes smaller than for example 78%.

In the foregoing embodiment, utility software that operates on the OS was used as a man-machine interface. Instead, with an input device such as a dedicated button and a display device such as an LED, the usability of the battery can be more improved than that of the foregoing embodiment.

In the foregoing embodiment, when the battery has been attached to the main body of the personal computer, a proper charge current is set to the battery. Instead, by default, a standard charge current may be supplied to the battery regardless of its charge amount. With an input device such as a dedicated mechanical button or utility software, the user can select the function of the embodiment of the present invention. As a result, the usability of the battery can be more improved than that of the foregoing embodiment.

In addition, besides a charge current set for each battery, a quick charge current may be set for example with an optional command. With a dedicated input device (mechanical button, utility software, or the like), a quick charge function may be supported according to the same theory of the foregoing embodiment.

In the foregoing embodiment, as an exemplary electronic apparatus, a laptop personal computer was described. However, an embodiment of the present invention can be applied to any electronic apparatus as long as it uses a battery. For example, an embodiment of the present invention can be applied to a portable game machine, a mobile phone, and so forth.

In addition, in the foregoing embodiment, communications between the main body side and the battery side are used by the EC according to the foregoing standard. Of course, the communications between the main body side and the battery side may be used by a dedicated device according to another standard.

It should be understood by those skilled in the art that various modifications, combinations, sub-combinations and alternations may occur depending on design requirements and other factors insofar as they are within the scope of the appended claims or the equivalents thereof.

What is claimed is:

1. An electronic apparatus, comprising:
a battery;
a main body which operates with the battery as a power supply;
a charging unit that charges the battery;
a screen menu displayed on a display unit, the screen menu including selectable modes by which a user can select from (i) 100% of a maximum capacitance of the battery and (ii) one or more predetermined percentages less than 100% of the maximum capacitance of the battery;
a setting unit that sets an upper capacitance of the battery based on the user selection on the screen menu; and
a controlling unit that controls the charging unit to stop charging the battery at the upper capacitance of the battery set by the setting unit.

2. The electronic apparatus as set forth in claim 1, further comprising:
a storing unit that stores a unique number of the battery and the maximum capacitance of the battery correspondence with each other, wherein
the obtaining unit obtains the unique number from the battery, and
the controlling unit obtains the maximum capacitance of the battery corresponding to the obtained unique number from the storing unit.

3. The electronic apparatus as set forth in claim 1, further comprising:
an obtaining unit that obtains a maximum capacitance of the battery.

4. The electronic apparatus as set forth in claim 3,
wherein the battery includes a memory that stores the maximum capacitance and the obtaining unit obtains the maximum charge amount from the memory.

5. The electronic apparatus as set forth in claim 4,
wherein the setting unit records the upper capacitance on the memory of the battery.

6. The electronic apparatus as set forth in claim 1, wherein the predetermined percentages include at least 80 percent and 50 percent.

7. A method of charging an electronic apparatus which operates with a chargeable battery as a power supply, the method comprising:
obtaining a maximum capacitance of the battery;
displaying a screen menu on a display unit, the screen menu including selectable modes by which a user can select from (i) 100% of a maximum capacitance of the battery and (ii) one or more predetermined percentages less than 100% of the maximum capacitance of the battery;
setting an upper capacitance of the battery based on the user selection on the screen menu;
charging the battery; and
controlling the charging of the battery to stop the charging of the battery at the upper capacitance of the battery set by the setting unit.

8. The method as set forth in claim 7, further comprising:
storing the maximum capacitance in a memory of the battery,
wherein the obtaining includes obtaining the maximum capacitance of the battery from the memory of the battery.

* * * * *